(12) United States Patent
Eitel et al.

(10) Patent No.: US 7,386,467 B2
(45) Date of Patent: Jun. 10, 2008

(54) APPARATUS AND METHOD OF MAINTAINING AND IMPROVING AGENT PERFORMANCE

(75) Inventors: Robert T. Eitel, Bartlett, IL (US); Anthony Dezonno, Bloomingdale, IL (US); Michael C. Hollatz, Huntley, IL (US)

(73) Assignee: Rockwell Electronic Commerce Corp., Wooddale, IL (US)

( * ) Notice: Subject to any disclaimer, the term of this patent is extended or adjusted under 35 U.S.C. 154(b) by 1202 days.

(21) Appl. No.: 09/941,046

(22) Filed: Aug. 28, 2001

(65) Prior Publication Data
US 2003/0046142 A1   Mar. 6, 2003

(51) Int. Cl.
*G06F 11/34* (2006.01)

(52) U.S. Cl. .................... 705/11; 379/265.07
(58) Field of Classification Search ............ 705/11; 379/265.07
See application file for complete search history.

(56) References Cited

U.S. PATENT DOCUMENTS

| | | | | |
|---|---|---|---|---|
| 5,164,983 A | * | 11/1992 | Brown et al. | 379/265.03 |
| 5,239,460 A | | 8/1993 | LaRoche | |
| 5,299,260 A | * | 3/1994 | Shaio | 379/266.07 |
| 5,458,494 A | * | 10/1995 | Krohn et al. | 705/11 |
| 5,535,256 A | * | 7/1996 | Maloney et al. | 379/309 |
| 5,555,179 A | | 9/1996 | Koyama et al. | |
| 5,765,033 A | | 6/1998 | Miloslavsky | |
| 5,825,869 A | * | 10/1998 | Brooks et al. | 379/309 |
| 5,926,539 A | | 7/1999 | Shtivelman | |
| 5,946,387 A | | 8/1999 | Miloslavsky | |
| 5,953,332 A | | 9/1999 | Miloslavsky | |
| 5,953,405 A | | 9/1999 | Miloslavsky | |
| 6,002,760 A | | 12/1999 | Gisby | |
| 6,021,428 A | | 2/2000 | Miloslavsky | |
| 6,044,145 A | | 3/2000 | Kelly et al. | |
| 6,044,368 A | | 3/2000 | Powers | |
| 6,049,779 A | * | 4/2000 | Berkson | 705/14 |
| 6,067,357 A | | 5/2000 | Kishinsky et al. | |
| 6,108,711 A | | 8/2000 | Beck et al. | |
| 6,138,139 A | | 10/2000 | Beck et al. | |

(Continued)

FOREIGN PATENT DOCUMENTS

EP   0866407   9/1998

(Continued)

OTHER PUBLICATIONS

Batt, Work organization, technology, and performance in customer service and sales, Industrial and Labor Relations Review, Jul. 1999, v.52, n.4, p. 539 (26 pages).*

(Continued)

*Primary Examiner*—Susanna M. Diaz
(74) *Attorney, Agent, or Firm*—Welsh & Katz, Ltd.

(57) ABSTRACT

A method and apparatus are provided for maintaining and improving a performance level of an agent performing a plurality of tasks. The method includes the steps of providing a performance threshold for each task of the plurality of tasks, measuring a performance parameter of the agent in completing each of the plurality of tasks and training the agent when the measured performance parameter of the agent in performing a task exceeds the respective performance threshold of the task for each task of the plurality of tasks.

37 Claims, 1 Drawing Sheet

U.S. PATENT DOCUMENTS

| | | | |
|---|---|---|---|
| 6,167,395 A | 12/2000 | Beck et al. | |
| 6,170,011 B1 | 1/2001 | Beck et al. | |
| 6,175,563 B1 | 1/2001 | Miloslavsky | |
| 6,175,564 B1 | 1/2001 | Miloslavsky et al. | |
| 6,185,292 B1 | 2/2001 | Miloslavsky | |
| 6,324,282 B1 * | 11/2001 | McIllwaine et al. | 705/11 |
| 6,345,305 B1 | 2/2002 | Beck et al. | |
| 6,373,836 B1 | 4/2002 | Deryugin et al. | |
| 6,389,007 B1 | 5/2002 | Shenkman et al. | |
| 6,393,015 B1 | 5/2002 | Shtivelman | |
| 6,542,602 B1 * | 4/2003 | Elazar | 379/265.06 |
| 6,567,787 B1 * | 5/2003 | Walker et al. | 705/11 |
| 6,732,156 B2 | 5/2004 | Miloslavsky | |
| 6,938,048 B1 * | 8/2005 | Jilk et al. | 705/11 |
| 6,959,078 B1 * | 10/2005 | Eilbacher et al. | 379/265.03 |
| 7,110,525 B1 * | 9/2006 | Heller et al. | 379/265.11 |
| 2001/0032120 A1 * | 10/2001 | Stuart et al. | 705/11 |
| 2003/0002653 A1 * | 1/2003 | Uckun | 379/266.06 |
| 2003/0187723 A1 * | 10/2003 | Hadden et al. | 705/11 |

FOREIGN PATENT DOCUMENTS

| | | |
|---|---|---|
| WO | WO 00/44160 | 7/2000 |

OTHER PUBLICATIONS

Doyle, Calling all trainers, Training and Development, Jan. 1998, v.52, n.1, p. 58 (11 pages).*

Emerson, Digging it out, Direct, Dec. 2000, v.12, n.16, p. T1, [online], [retrieved Oct. 27, 2005 via DIALOG 16:08186976] (2 pages).*

Anonymous, On track: Amtrak to convert phone centers to interactive speech recognition, Direct, Jun. 2000, v.12, n.8, p. T1+, [online], [retrieved Oct. 27, 2005 via DIALOG 9:02171376] (3 pages).*

* cited by examiner

APPARATUS AND METHOD OF MAINTAINING AND IMPROVING AGENT PERFORMANCE

FIELD OF THE INVENTION

The field of the invention relates to telemarketing and more particularly to the performance of telemarketing agents.

BACKGROUND OF THE INVENTION

Telemarketing and the use of agents for telemarketing are well understood concepts. In the case of cold calls for sales, agents are typically given a written script of information to be read to a customer. Additional scripts may be provided for commonly asked questions.

In the case of inbound calls, agents are often given rudimentary training (e.g., product brochures) to familiarize the agent with products or services to be promoted. Where an agent finds himself/herself unable to answer a question, the agent simply transfers the caller to another agent.

To leverage the productivity of telemarketing agents, automatic call distributors (ACDs) are often used to route calls to agents. In the case of outgoing sales calls, a list of potential customers are transferred to the ACD. The ACD monitors the status of the agents (i.e., whether their telephones are active) and places calls upon detecting idle agents.

Upon placing a call, the ACD monitors the call connection for pick-up by the called party. Upon detecting the presence of the called party, the ACD may connect the call to an idle agent.

Once a customer has answered an outgoing call, the outgoing call may be handled similarly to an incoming call. The ACD may seek to discern a probable subject matter and purpose of the call (e.g., in the case of an outgoing call of a sales campaign, the sale of a particular product, in the case of an incoming call, the subject matter handled by the service or sales organization dialed, etc.).

If a number of agents are idle when the call is processed, then the ACD may use the discerned purpose of the call to select the most qualified agent to handle the call. Further, the ACD may notify an associated computer system of the purpose of the call and the computer system may present an appropriate script on a terminal of the agent regarding handling of the call.

While ACDs are very effective in automating the process of telemarketing, ACDs are a victim of their own programming complexity. Because of the vast number of call types and call handling procedures possible, it is difficult to evaluate the performance of any one agent. To overcome this difficulty, call center supervisors are often forced to directly monitor agent calls to form an opinion on performance. Accordingly, a need exists for a method of evaluating the performance of telemarketing agents, which does not depend upon direct monitoring.

SUMMARY

A method and apparatus are provided for maintaining and improving a performance level of an agent performing a plurality of tasks. The method includes the steps of providing a performance threshold for each task of the plurality of tasks, measuring a performance parameter of the agent in completing each of the plurality of tasks and training the agent when the measured performance parameter of the agent in performing a task exceeds the respective performance threshold of the task for each task of the plurality of tasks.

DETAILED DESCRIPTION OF A PREFERRED EMBODIMENT

Figure 1:
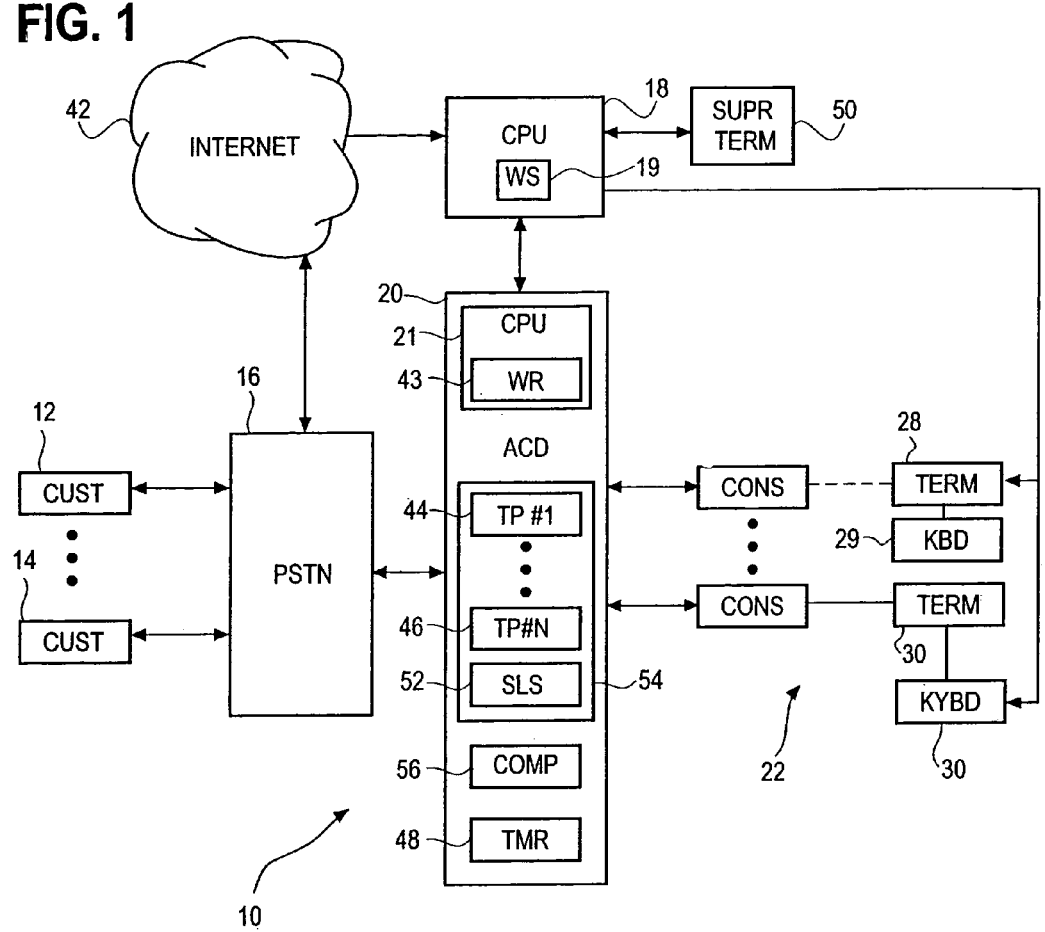
FIG. 1 is a block diagram of a contact center system in accordance with an illustrated embodiment of the invention.

FIG. 1 is a block diagram of a transaction processing system 10, generally in accordance with an illustrated embodiment of the invention. Under the illustrated embodiment, calls from customers 12, 14 may be processed through the public switched telephone network (PSTN) 16 or through the Internet 42.

As calls arrive, an ACD 20 may route the calls to agents 22, 23 based upon call associated information. For outgoing calls, call associated information may be a called number and a purpose of the call (e.g., a sales promotion on widgets). For incoming calls, call associated information may be delivered from the Public Switched Telephone Network (PSTN) 16 (e.g., Automatic Number Identification, (ANI), Dialed Number Identification Service (DNIS), etc.). From the call associated information, a CPU 21 may be able to identify the caller or intended destination of the call. In either case, the call associated information allows the ACD 20 to discern a purpose of the call and to more intelligently route the call to the most qualified agent 22, 23.

Figure 2:
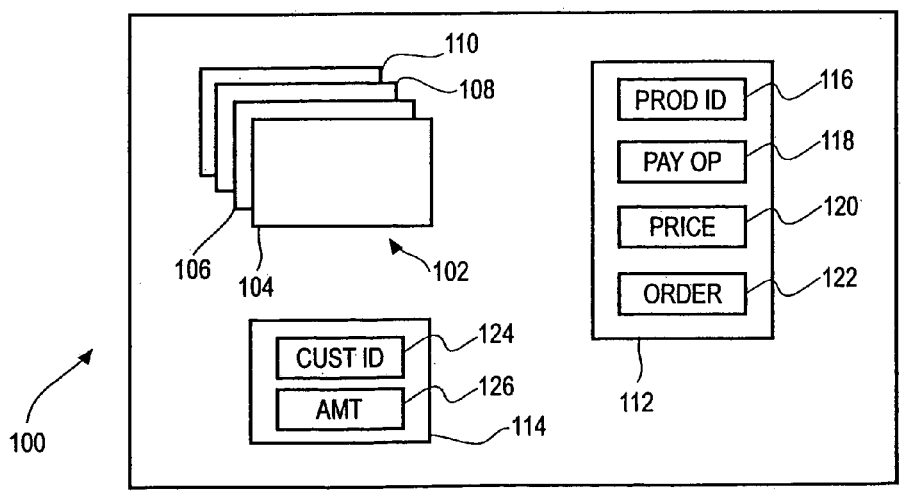
FIG. 2 depicts screens that may be used by an agent of the system of FIG. 1.

Upon discerning a purpose of the call, a host 18 associated with the ACD 20 may retrieve customer records and a script to be read to the customer 12, 14. The records and/or script 102 (FIG. 2) may be presented on a display 100 of the agent's terminal 28, 30. If the call is an outgoing call that is part of a promotional campaign, a first page 104 of the script 102 read to the customer 12, 14 may include a explanation of the purpose of the call. Other pages (e.g., 106) may include an explanation of the promoted subject matter. Still other pages (e.g., 108, 110) may include frequently asked questions.

If the promotional campaign is a sales effort, then another window 112 may be provided for identification and entry of product information. Another window 114 may be provided for entry of payment information.

For example, if during the presentation of sales information on a widget, the customer 12, 14 should express interest in purchasing the widget, the agent may enter a product identifier on a first line 116 of the window 112. A payment option may be entered on a second line 118 along with a price on a third line 120. Another window 114 may be provided so that the customer 12, 14 may provide a customer identifier (e.g., credit card number, open account number, etc.) for entry on a payment line 124. A total charge for the purchase may be provided on line 126.

In order to maintain and improve the performance of the agents 22, 23, certain performance parameters indicative of the effectiveness of the agent in performing certain tasks may be measured by a performance processor 21 and compared against a set of threshold values. For example, the time that an agent spends reciting information from the script 102 may be measured by a timer (either within the CPU 21 or as a separate timer 48 as shown in FIG. 1) and compared within a comparator 56 against a threshold parameter 44, 46 stored in memory 54. The time between completion of the script 102 and conclusion of the call may be another performance parameter measured by the timer 48 and compared with a threshold parameter 44, 46. Where the threshold of successive tasks exceeds the respective threshold values, the agent 22, 23 may be trained and re-trained, as necessary, to improve the agent's performance level against the measured performance parameters.

As used herein, the system 10 functions to notify a supervisor of the need to schedule agents for training. Training may be performed by any method known in the art.

In general, the performance parameters of any of a number of different tasks may be defined for measurement and comparison with threshold values. For example, the recitation of each page 104, 106, 108, 110 of the script 102 may be regarded as a separate task.

Further, any performance parameter may be selected for measurement and comparison. For example, the number of errors made by the agent in entering the ordering information may be measured (e.g., automatically, manually, etc.) and compared with a threshold 44, 46. Word recognition software 43 within the CPU 21 may detect mispronounced words or inappropriate words (e.g., slang, swearing, etc.) in presentation of the scripts 102 to the customer 12, 14 and compare the number of incidences with a threshold value 44, 46.

Alternatively, a marketing organization using the system 10 may provide a website 19 allowing customers 12, 14 to forward questions or comments under an e-mail format. The website 19 may also provide a softkey for initiating voice over IP (VoIP) connections with the CPU 18.

Keywords of received e-mail may be read by the CPU 18 and used as an indication of the purpose of the call for purposes of call routing to agents 22, 23. Each e-mail may be regarded as a separate task. The time each agent 22, 23 spends responding to each e-mail may be used as a measurement of agent performance against threshold values 44, 46.

Where a VoIP request is received by the CPU 18, the information content of the webpage may provide an indication of the purpose of the call. Upon determining the purpose, the CPU 18 may route the VoIP call to an agent 22, 23 and present script as described above. Performance parameters may be measured and compared with thresholds 44, 46, also as described above.

Since some e-mails (and/or calls) may be more difficult than others, the time of response may be coupled with sales. Time of response to e-mails may be used as a first measured task while sales volume may be used as a second measured task. The use of both time and sales volume may be a particularly useful means of determining agent productivity.

As a further alternative, the measured task may be a single repetitive operation (e.g., entry of bill payment information by a clerk of a public utility company working at a terminal 28, 30 coupled to a bill payment host 18). As the clerk opens each letter from the customer 12, 14, the clerk 22, 23 may recover a payment coupon and enter a customer account number on a payment line 124. The host 18 may respond with product information (i.e., a description of the service provided) on another line 116 and an outstanding balance on another line 120.

The clerk 22, 23 may select a payment option from a menu 118 depending upon the payment mode (e.g., check credit card, money order, etc.). The tendered payment may be entered on line 126. Completion of the task may be indicated by activation of a order complete softkey 122.

As above, the time required for entry of payment information for each bill may be measured by a timer 48 and compared against respective thresholds. The respective thresholds may have a single numeric value or may be adjusted for time of day, complexity of the bill involved or any of a number of other factors.

Threshold values may be determined by any of a number of different methods. For example, the performance parameters of a highly efficient agent may be measured and used as threshold values.

Alternatively, the performance parameters of all agents for one or more tasks may be measured and averaged. Averaging the performance levels of all agents for each task may be used to provide a particularly efficient means of identifying under performing agents, even as tasks change.

For example, some tasks (e.g., sales per unit time period) are particularly well suited to averaging. In this case, the sales of all agents 22, 23 (e.g., per work shift) may be averaged and stored as a threshold value 52 in memory 54. Sales of each agent per shift may be compared with the value 52 in memory to identify under performing agents.

Once it has been determined by the CPU 18 that an agent's performance has exceeded the respective threshold value, the agent and tasks may be reported by the CPU 18 to a supervisor. Further, the agents 22, 23 and tasks of the report may be sorted by the CPU 18 (functioning as a sorting processor) and presented on a supervisors terminal 50 in order of the magnitude by which each agent 22, 23 exceeded the threshold.

A specific embodiment of a method and apparatus for maintaining and improving a performance level of an agent according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

The invention claimed is:

1. A method of maintaining and improving a performance level of an agent performing a plurality of tasks, such method comprising the steps of:
   providing a performance threshold for each task of the plurality of tasks;
   electronically monitoring at least some of the plurality of agent tasks to measure performance parameters of the agent in completing successive tasks of the plurality of tasks including the tasks of reciting information from at least some screens of a predetermined progression of screens:
   automatically adjusting a respective performance threshold in response to a change in a parameter related to at least one of the successive tasks; and
   generating a notification of the need for training the agent when the measured performance parameters of the agent in performing the successive tasks exceeds the respective performance thresholds of the successive tasks of the plurality of tasks.

2. The method of maintaining and improving a performance level of an agent as in claim 1 further comprising comparing the measured performance parameter of a task with the respective performance threshold of the task for each task of the plurality of tasks.

3. The method of maintaining and improving a performance level of an agent as in claim 1 wherein the plurality of tasks further comprises a single repetitive operation.

4. The method of maintaining and improving a performance level of an agent as in claim 1 wherein the plurality of tasks parameter further comprises time between screens in a predetermined progression of screens.

5. The method of maintaining and improving a performance level of an agent as in claim 1 wherein the measured parameter further comprises detected errors in the recited information of the at least some screens.

6. The method of maintaining and improving a performance level of an agent as in claim 1 wherein the measured parameter further comprises at least one of errors per unit sale, average call handling, and sales per unit time period.

7. The method of maintaining and improving a performance level of an agent as in claim 1 comprising coupling multiple performance parameters for different respective tasks and comparing the coupled multiple performance parameters to respective thresholds.

8. The method of maintaining and improving a performance level of an agent as in claim 1 wherein the step of providing a performance threshold for each task of the plurality of tasks further comprises measuring a performance parameter of an exemplary agent in completing each task of the plurality of tasks.

9. The method of maintaining and improving a performance level of an agent as in claim 1 wherein the plurality of tasks further comprises entry of bill and bill payment information from a plurality of customers into a billing computer.

10. The method of maintaining and improving a performance level of an agent as in claim 9 wherein the measured parameter further comprises time for entry of each bill.

11. The method of maintaining and improving a performance level of an agent as in claim 10 wherein the measured parameter further comprises errors per entered bill.

12. An apparatus for maintaining and improving a performance level of an agent performing a plurality of tasks, such apparatus comprising:
   a performance threshold for each task of the plurality of tasks;
   means for monitoring at least some of the plurality of agent tasks to measure performance parameters of the agent in completing successive tasks of the plurality of tasks including the tasks of reciting information from at least some screens of a predetermined progression of screens;
   means for automatically adjusting a respective performance threshold in response to a change in a parameter related to at least one of the successive tasks; and
   means for notifying a supervisor when the measured performance parameters of the agent in performing the successive tasks exceeds the respective performance thresholds of the successive tasks of the plurality of tasks.

13. The apparatus for maintaining and improving a performance level of an agent as in claim 12 further comprising means for comparing the measured performance parameter of a task with the respective performance threshold of the task for each task of the plurality of tasks.

14. The apparatus for maintaining and improving a performance level of an agent as in claim 13 wherein the plurality of tasks parameter further comprises time between screens in a predetermined progression of screens.

15. The apparatus for maintaining and improving a performance level of an agent as in claim 12 wherein the plurality of tasks further comprises a single repetitive operation.

16. The apparatus for maintaining and improving a performance level of an agent as in claim 12 wherein the means for measuring a performance parameter further comprises means for detecting errors in the recited information of the at least some screens.

17. The apparatus for maintaining and improving a performance level of an agent as in claim 12 wherein the measured performance parameter further comprises sales per unit time period.

18. The apparatus for maintaining and improving a performance level of an agent as in claim 12 wherein the measured parameter further comprises errors per unit sale.

19. The apparatus for maintaining and improving a performance level of an agent as in claim 12 wherein the means for measuring the performance parameter further comprises means for measuring an average call handling time.

20. The apparatus for maintaining and improving a performance level of an agent as in claim 12 wherein the means for providing a performance threshold for each task of the plurality of tasks further comprises means for measuring a performance parameter of an exemplary agent in completing each task of the plurality of tasks.

21. The apparatus for maintaining and improving a performance level of an agent as in claim 12 wherein the plurality of tasks further comprises entry of bill and bill payment information from a plurality of customers into a billing computer.

22. The apparatus for maintaining and improving a performance level of an agent as in claim 21 wherein the measured parameter further comprises time for entry of each bill.

23. The apparatus for maintaining and improving a performance level of an agent as in claim 22 wherein the measured parameter further comprises errors per entered bill.

24. An apparatus for maintaining and improving a performance level of a plurality of agents performing a plurality of tasks, such apparatus comprising:
   a performance threshold for each task of the plurality of tasks;
   means for monitoring at least some of the plurality of agent tasks to measure performance parameters of each agent of the plurality of agents in completing successive tasks of the plurality of tasks including the task of reciting information from at least some screens of a predetermined progression of screens;
   means for automatically adjusting the respective performance threshold in response to a change in parameter related to at least one of the successive tasks;
   means for notifying a supervisor when the measured performance parameters of any agent of the plurality of agents in performing the successive tasks exceeds the respective performance thresholds of the successive tasks of the plurality of tasks; and
   means for sorting the notifications to the supervisor based upon a relative magnitude by which the measured performance parameters exceeded the performance thresholds.

25. An apparatus for maintaining and improving a performance level of an agent performing a plurality of tasks, such apparatus comprising:
   a performance threshold for each task of the plurality of tasks;
   a performance processor adapted to monitor at least some of the plurality of agent tasks to measure a performance parameters of the agent in completing successive tasks of the plurality of tasks including the tasks of reciting information from at least some screens of a predetermined progression of screens and adapted to automatically adjust a respective performance threshold in response to a change in a parameter related to at least one task; and
   a display adapted to notify a supervisor when the measured performance parameters of the agent in performing the successive tasks exceeds the respective performance thresholds of the successive tasks of the plurality of tasks.

26. The apparatus for maintaining and improving a performance level of an agent as in claim 25 further comprising a comparator adapted to compare the measured performance parameter of a task with the respective performance threshold of the task for each task of the plurality of tasks.

27. The apparatus for maintaining and improving a performance level of an agent as in claim 26 wherein the plurality of tasks parameter further comprises time between screens in a predetermined progression of screens.

28. The apparatus for maintaining and improving a performance level of an agent as in claim 25 wherein the plurality of tasks further comprises a single repetitive operation.

29. The apparatus for maintaining and improving a performance level of an agent as in claim 25 wherein the performance processor for measuring a performance parameter further comprises word recognition software adapted to detect errors in the recited information of the at least some screens.

30. The apparatus for maintaining and improving a performance level of agent as in claim 25 wherein the measured performance parameter further comprises sales per unit time period.

31. The apparatus for maintaining and improving a performance level of an agent as in claim 25 wherein the measured parameter further comprises errors per unit sale.

32. The apparatus for maintaining and improving a performance level of an agent as in claim 25 wherein the means for measuring the performance parameter further comprises a timer adapted to measure an average call handling time.

33. The apparatus for maintaining and improving a performance level of an agent as in claim 25 wherein the performance threshold for each task of the plurality of tasks further comprises a measured performance parameter of an exemplary agent in completing each task of the plurality of tasks.

34. The apparatus for maintaining and improving a performance level of an agent as in claim 25 wherein the plurality of tasks further comprises entry of bill and bill payment information from a plurality of customers into a billing computer.

35. The apparatus for maintaining and improving a performance level of an agent as in claim 34 wherein the measured parameter further comprises time for entry of each bill.

36. The apparatus for maintaining and improving a performance level of an agent as in claim 35 wherein the measured parameter further comprises errors per entered bill.

37. An apparatus for maintaining and improving a performance level of a plurality of agents performing a plurality of tasks, such apparatus comprising:
- a performance threshold for each task of the plurality of tasks;
- a performance processor adapted to monitor at least some of the plurality of agent tasks to measure performance parameters of each agent of the plurality of agents in completing successive tasks of the plurality of tasks including the tasks of reciting information from at least some screens of a predetermined progression of screens and adapted to automatically adjust the respective performance threshold in response to a change in parameter related to at least one task;
- a display adapted to notify a supervisor when the measured performance parameters of any agent of the plurality of agents in performing the successive tasks exceeds the respective performance thresholds of the successive tasks of the plurality of tasks; and
- a sorting processor adapted to sort the notifications to the supervisor based upon a relative magnitude by which the measured performance parameters exceeded the performance thresholds.

* * * * *